(12) United States Patent
Eriksson et al.

(10) Patent No.: US 7,143,171 B2
(45) Date of Patent: Nov. 28, 2006

(54) ACCESS POINT DISCOVERY AND SELECTION

(75) Inventors: Göran A. P. Eriksson, Sundbyberg (SE); Jan Höller, Stockholm (SE); Niklas Björk, Sundbyberg (SE); Charilaos Christopoulos, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 693 days.

(21) Appl. No.: 09/986,417

(22) Filed: Nov. 8, 2001

(65) Prior Publication Data

US 2002/0059453 A1 May 16, 2002

Related U.S. Application Data

(60) Provisional application No. 60/247,057, filed on Nov. 13, 2000.

(51) Int. Cl.
*G06F 15/16* (2006.01)
*H04Q 7/20* (2006.01)

(52) U.S. Cl. .................... 709/227; 709/232; 455/432.1

(58) Field of Classification Search .. 455/432.1–435.3; 370/328–338; 709/227–232; 707/1–10
See application file for complete search history.

(56) References Cited

U.S. PATENT DOCUMENTS

| | | | |
|---|---|---|---|
| 5,594,947 A | 1/1997 | Grube et al. | |
| 5,724,346 A * | 3/1998 | Kobayashi et al. | 370/329 |
| 5,912,644 A | 6/1999 | Wang | |
| 5,987,062 A * | 11/1999 | Engwer et al. | 375/225 |
| 6,208,857 B1 | 3/2001 | Agre et al. | |
| 6,321,083 B1 * | 11/2001 | Vaara et al. | 455/446 |
| 6,331,972 B1 * | 12/2001 | Harris et al. | 370/313 |
| 6,356,541 B1 * | 3/2002 | Muller et al. | 370/338 |
| 6,483,835 B1 * | 11/2002 | Tanigawa et al. | 370/395.21 |
| 6,522,881 B1 * | 2/2003 | Feder et al. | 455/437 |
| 6,535,493 B1 * | 3/2003 | Lee et al. | 370/329 |
| 6,538,996 B1 * | 3/2003 | West et al. | 370/238 |
| 6,580,700 B1 * | 6/2003 | Pinard et al. | 455/436 |
| 6,721,291 B1 * | 4/2004 | Bergenwall et al. | 370/331 |
| 6,748,217 B1 * | 6/2004 | Hunzinger et al. | 455/435.2 |
| 6,771,951 B1 * | 8/2004 | Leonetti | 455/414.1 |
| 6,963,556 B1 * | 11/2005 | Goldman et al. | 370/352 |
| 6,965,948 B1 * | 11/2005 | Eneborg et al. | 709/250 |
| 2002/0083429 A1 * | 6/2002 | Rozenfeld et al. | 717/174 |
| 2003/0036374 A1 * | 2/2003 | English et al. | 455/436 |

FOREIGN PATENT DOCUMENTS

| | | |
|---|---|---|
| EP | 0781064 A2 | 6/1997 |
| WO | WO 97/40638 A1 | 10/1997 |
| WO | 01/50788 | 7/2001 |

\* cited by examiner

*Primary Examiner*—David Wiley
*Assistant Examiner*—Joseph E. Avellino

(57) ABSTRACT

A method and system in a heterogeneous environment, capable of locating at least one optimal access area or point for supporting one or more access technologies requested by the user. The determination of the optimal access areas or points is based in part on the location of the device, the specified user preferences, service/application requirements and the capabilities of available access network connections. The optimal access points, and alternative options, are mapped in accordance with the resulting location, combined requirements and service/application requirements of the communication device. This mapping and other information/recommendations related to the access points are then provided to the communication device for action by the user.

51 Claims, 7 Drawing Sheets

| USER PREFERENCES |||||
|---|---|---|---|---|
| | COST | SPEED | QUALITY | SECURITY |
| USER A | MINIMAL COST | NO PREFERENCE | NO PREFERENCE | 128 BIT ENCRYPTION |
| USER B | NO PREFERENCE | >128 Kbps | HIGH QUALITY | NO PREFERENCE |

Fig. 3B

ACCESS POINT DISCOVERY AND SELECTION

This application claims priority under 35 U.S.C. § 119(e) to U.S. Provisional Application No. 60/247,057 filed Nov. 13, 2000, the entire disclosure of which is herein expressly incorporated by reference.

BACKGROUND

The present invention generally relates to a method and system which supports multiple transport technologies. In particular, the present invention is directed towards a method and system for discovering and selecting access points for communication devices within a heterogeneous access environment.

In order to communicate with another party, a communication device, a communication network and a point of access to the communication network are required. In traditional telecommunication networks, there has been mainly one possible access method to a network at any given point in space-time. FIG. 1A illustrates a communication device, a point of access and a communication network. In FIG. 1A a landline telephone 105 is a communication device which connects to the public switched telephone network 115 via a wall jack 110. Although FIG. 1A illustrates wall jack 110 as a point of access to the communication network, it will be recognized that the wall jack 110 may be connected, in the building in which the telephone 105 is located, to a junction box where a telephone companies' trunk lines connect the building to the PSTN 115.

Even if there were several accesses point possibilities, conventionally a communication device was tied to a single access mechanism only. In other words, in conventional communication networks the access and transport network, e.g., the transport technology (i.e., technology carrying information between nodes), and the service provider network were tied together. For example, in a public switched telephone network (PSTN) system, a telephone is tied by a fixed access line, e.g., using twisted pair wiring, to the PSTN network. Similarly, a GSM mobile phone is traditionally tied to the wireless network through a GSM air interface.

Ongoing developments have been made to separate the transport technology from the access technology. Similar to the Internet technology, separation between application and access transports (included in the "link" layer) are progressively being applied in telecommunication systems. For example, in the IP-based communication networks a layering approach can be implemented in which the application implementing the user service such as 'telephony' is separated from the transport technology, including the access. In addition, it is currently possible for a communication device to support several access technologies. For example, a communication device can be connected to one or more networks using several access technologies simultaneously, e.g. cellular and short-range radio, such as Bluetooth or HiperLan.

FIG. 1B illustrates another communication device, point of access and communication network. In FIG. 1B there is a single communication device 120 in the form of a mobile radio telephone. The mobile radio telephone 120 normally connects to a mobile radio network via a long range access point. For example, the radio telephone may connect to one of the three access points shown in the dashed line 160, which includes a base station 125, a satellite dish 126, and a satellite station 127. For simplicity purposes, we will assume that the mobile radio telephone 120 is connected to the mobile radio network via long range access point 125, the base station. The base station 125 is connected to a communication transport network 130, such as, GSM network, a wideband CDMA network (WCMDA), a GSM 2000 network, a PDC or a D-AMPS network. The entire area of FIG. 1B, shown here as area 150, illustrates the operational range of long range access point 125

Also illustrated in FIG. 1B, is a short range access point 135 connected to another communication transport network 140. By connecting to a network via some access, an individual, or a machine, can communicate with other people, or with other machines such as Web servers. Dashed line 145 illustrates the operational range of the short range access point 135. It will be recognized that the transport networks illustrated may comprise one or more transport networks between a sending and a receiving communication device. If more than one transport network is involved a gateway between the transport networks may be required.

As illustrated in FIG. 1B, mobile radio telephone 120 normally communicates using the base station 125 as an access point to the network 130. However, the mobile radio telephone 120 may also contain the functionality to communicate with the network 140 using short range access point 135. As illustrated by the dashed line 145 surrounding the mobile radio telephone 120 and the short range access point 135, and by the area 150 surrounding base station 125 and mobile radio telephone 120, the mobile radio may be within the operational range of two different access points, i.e., short range access point 135 and long range access point 125. However, currently there are no provisions for aiding a user of a communication device in the selection of access technologies. For example, the user of mobile radio telephone 120 must manually select the type of access technology to be used, i.e., the GSM air interface with long range access point 125 or, for example, a HiperLan air interface with short range access point 135. In particular, there is currently no mechanism for providing information to a user or to a communication device which would aid in the decision of how to efficiently use different access technologies, including how to position the communication device to achieve an optimal orientation with respect to an access point.

Accordingly, it would be desirable to gather information about available access possibilities in every given point of space down to parts of meters and to map the position of user and/or communication device. Further, it would be desirable to provide an analysis of how the access alternatives map to the requirements of the application on the transport, taking user preferences on matters such as cost into account. In addition, it would be desirable to distribute and present the information to application(s) and the user including a recommendation on user action.

SUMMARY

In accordance with exemplary embodiments of the present invention, the above mentioned drawbacks and difficulties found in conventional communication systems supporting one or more than one access technology are overcome.

Depending upon the geographical location of a communication device, the palette of available access possibilities will vary, sometimes on a scale of meters and even parts of meters, as well as over time. Since the communication device is carried by a user, the position of the communication device can be influenced by the user, e.g., by moving the communication device closer or farther from an access point, and by a relative spatial orientation between the communication device, and more specifically, the spatial orientation between an antenna of a communication device and an antenna of the access point. The more aligned the antennas of the communication device and the access point are, the better the communication connection.

For example, a user may have a communication device which has the capability to connect to a network using either HiperLan or wideband code division multiple access (W-CDMA), or both simultaneously. Imagine that the user is just outside the HiperLan range. A call arrives, and the user is informed that the call contains both an audio and a video component. Using the W-CDMA access for high bandwidth media, such as video, is quite expensive. The user may recognize the expense of cellular access for this particular type of call, and may also recognize that taking this call over a HiperLan network would provide higher capacity and result in less cost for the call. The user, however, may not have information as to where the closest point of access for HiperLan is available, and even if the user were aware of a nearby access point s/he would not be able to evaluate such things as the user's preferences and/or service/application requirements in order to determine the optimal access point. Accordingly, the user is currently not be able to obtain quick and accurate information relating to access points which are personalized and unique to that users needs and desires.

In accordance with one embodiment of the present invention a method and system for providing access information to a communication device is disclosed which determines the position of, combined requirements associated with, and the access points available to the communication device. The combined requirements are based on user preferences and the service/application requirements. The available access points are then mapped using the position and combined requirements. This mapping and other information related to the access points can then be used for determining and selecting an optimal or other access points for the communication device. The information is then analyzed and presented to the user with recommendations and directions.

In accordance with an exemplary aspect of the present invention, the mapping of the available access points is determined relative to the position of the communication device. A spatial relation between the available access points and the communication device is determined, and the information containing both the position and the spatial relation between access points is provided to the user.

In another aspect of the present invention, the position information and requirements of a first communication device are received by a second communication device, which then forwards the position and requirement information to an access network. The second communication device then receives from the access network, information related to access points and then forwards this information to the first communication device.

In accordance with yet another aspect of the present invention, the method and system operates in a network which supports a heterogeneous transport environment for multitask devices. The information provided regarding available access points is a compromise between the desired overlapping coverage areas for each access network and the combined requirements. This allows for optimal transport access so that data can be simultaneously transmitted over each transport connection.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein:

FIG. 3B illustrates an example of possible user preferences and how those preferences can differ depending on the user, in accordance with exemplary embodiments of the present invention;

DETAILED DESCRIPTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, signaling formats and circuits are omitted so as not to obscure the description of the present invention.

Figure 2:
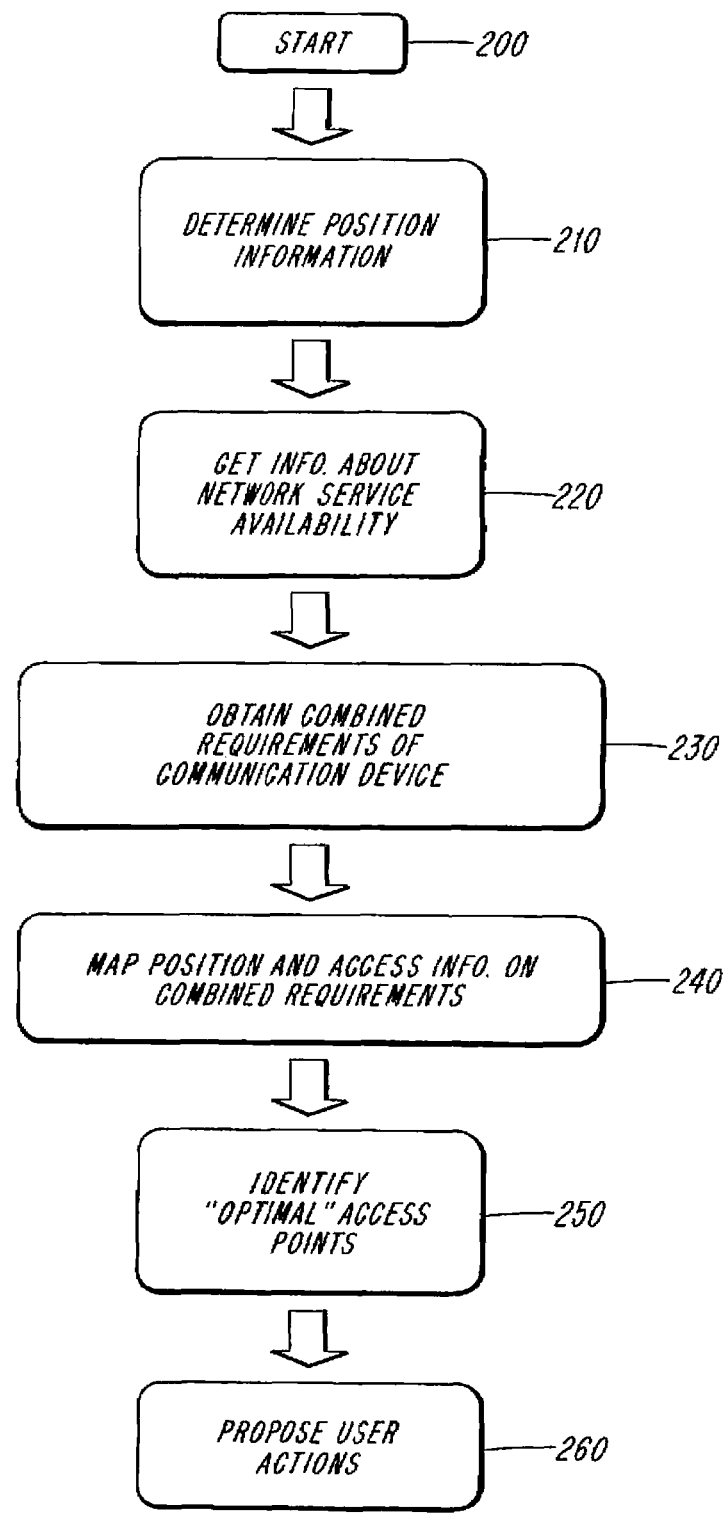
FIG. 2 illustrates a method for obtaining information associated with an optimal access point based upon user preferences, in accordance with an exemplary embodiment of the present invention.

FIG. 2 illustrates an exemplary method for obtaining information regarding available access points in accordance with the present invention. Initially, some triggering event starts the process (step 200). This triggering event can be initiated by the user, or done automatically at various intervals or as determined necessary by a central intelligence system. After the process is started, the selection of a position or area for where service shall be used is provided to the access network (step 210). This position information can be obtained by the overall communication network system, the communication devices, and/or the user. For example, if the communication device is equipped with a global positioning satellite (GPS) receiver, the communication device can determine its position using signals received from the GPS satellites. The communication device can also determine its position using known triangulation techniques which measure signals from two or more base stations to determine the communication device's position. Similarly, the access network can provide the position information using known triangulation techniques. Alternatively, the precise or general position of the communication device may also be given by the user, e.g. by selecting a point or area on a map. Further, the provided position of the communication device can also be different from the actual position of the user, e.g., when the user wishes to find out information about available transport connections in an area of future interest. Additionally, according to an exemplary embodiment, the position information provided by the user is combined with one or more of the other automatic positioning techniques, e.g., triangulation, to determine the position of the communication device. For example, the user can identify a target area in which other techniques can be used to accurately locate the communication device.

Figure 1A:
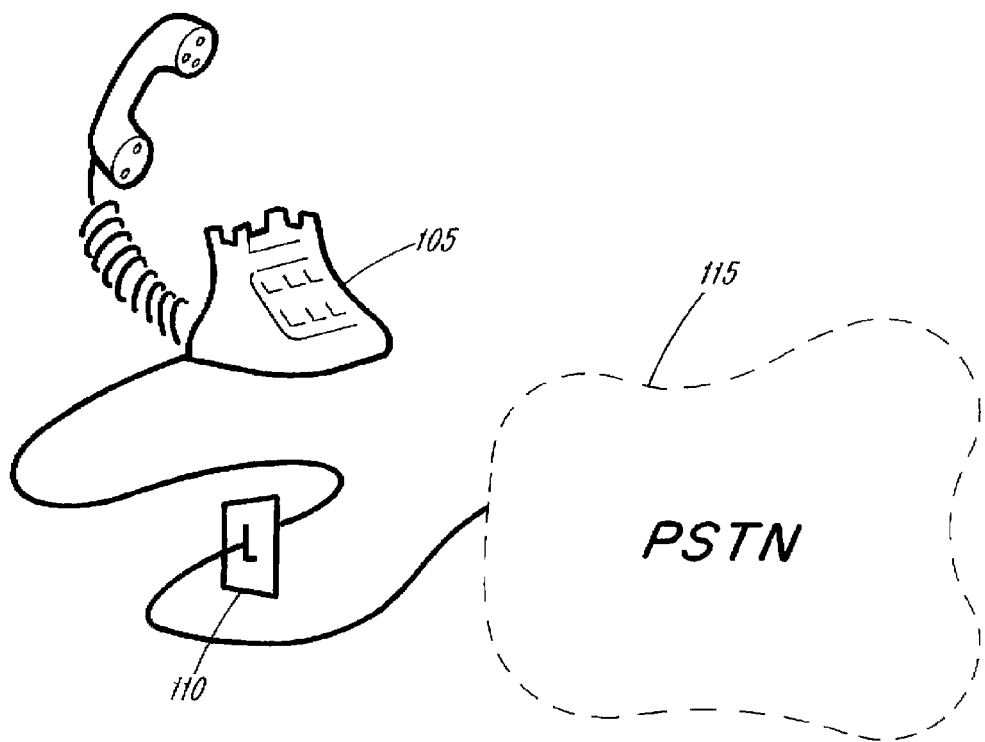
FIGS. 1A and 1B illustrate communication devices, access points and communication networks.
Figure 1B:
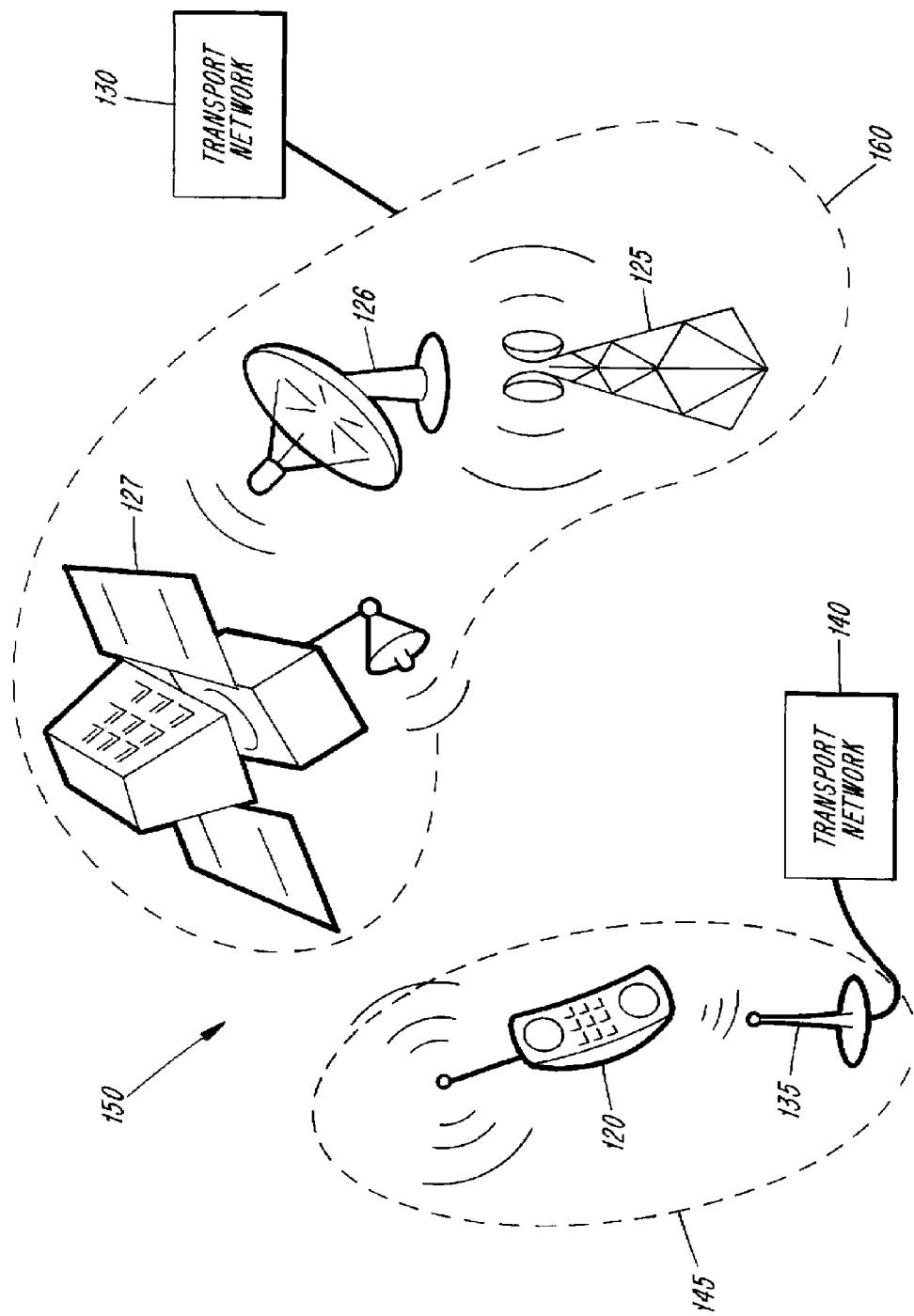

After the position or area of service is determined, access information about network service availability in or around the area of interest is determined (step 220). In an exemplary embodiment of the invention, the communication device gathers the access information from each access point alternative available to the communication device. For example, referring again to FIG. 1B, the communication device 120 can scan radio frequencies using various access technologies to determine whether the communication device 120 is within radio range of a short range access point 135 or a long range access point 125. Alternatively, or additionally, each access network can report information to a central point about available access points corresponding to the respective access network. This information can then be used by the central point in determining available access points in a geographical area designated by the user or in an area near the communication device. For example, long range access point 125 can gather information about available short range access point 135. The long range access point 125 can also determine or gather information about the desired position and combined requirements of the communication device 120, and then determine that short range access point 135 is available for use by the communication device 120.

Next, the combined requirements of the communication device are obtained (step 230). The present invention allows a user to specify various preferences for a desired access point. These user preferences can include, but are not limited to, the costs, speed, quality and security associated with the access points. The system also accounts for the services provided to the user and the associated applications for providing the service, by establishing service/application requirements. The user preferences, as well as the general profile of the communication device (i.e., general information about the user), are then filtered with the service/application requirements to obtain the combined requirements for the device. These combined requirements can further include such information and considerations as the capabilities of the communication device or other devices within the user's "personal area network" (PAN). It will be recognized that a PAN comprises one or more communication devices associated with a particular user. In addition, the combined requirements can be compared with the capabilities of the network, to determine the similarities and differences between the two requirements. In order to prevent the system from failing, a compromise of the combined requirement may be employed when there are mismatches or discrepancies with respect with the network capabilities.

The position and access information are then mapped onto the combined requirements (step 240) to obtain mapped information. The mapping of the information can be performed by the communication device, a device in the PAN, the network, or a central point as described above. The mapping can also take into consideration the environment of the user, e.g., physical limitations for connecting to the access point, such as whether the user is in a meeting, in a car, on foot, etc. The result of the mapping analysis can then be used to identify or select the "optimal" access points (step 250). This selection of access points is a function of the mapped information. It is important to note that because the selection process is only a function of the mapped information, the selection does not have to be limited to the recommended "optimal" access point (as described hereinafter). For example, the mapped information may be a subset of the overall available access points, however the selection can be an access point outside the subset.

The result of the mapping and selection are presented to the user with recommended actions and possible alternatives (step 260). The recommendations are based on the result of the mapping (step 240) and/or the optimal access points (step 250). The recommendation and possible alternative procedure (step 260) can be performed automatically by a central intelligence located in either the communication device, the access network or the communication network system.

The user chooses an alternative and acts according to the instructions. For example, if a user wishes to establish a communication which involves both voice and video, it may be recommended that the user turn northeast and walk 25 meters where a point of access to a HiperLan network is provided. The actions needed to be taken by the user may also be done automatically. For example, the instructions to the user may be a simple orientation of the antenna movement of the communication device by either mechanical or electronic beam steering means for a stronger signal. The orientation of the antenna can be controlled by a central intelligence in conjunction with mechanical and/or electronic devices to either move the antenna or steer the antenna beam in the desired manner. The recommendation and possible alternatives can also be saved for future reference in the network, the communication device, or in a central point.

According to exemplary embodiments, the various steps in FIG. 2 can be shared or split between the user (or PAN) and the network system. For example, in accordance with one embodiment, the equipment in the PAN (or an individual communication device) can be used to initiate the process (step 200), establish the area in which access information is needed (step 210), obtain access information about available access point(s) in the area of interest (step 220), obtain the combined requirements of the communication device (step 230), map the position and access information onto combined requirements (step 240), identify the optimal access points (step 250), evaluate the options and provide recommendations on user actions (step 260). In accordance with another embodiment of the present invention, the network is capable of performing the steps of initiating the process (step 200), determining the access area of interest (step 210), obtaining access information for access point(s) in the area of interest (step 220), establishing the combined requirements of the communication device (step 230), mapping the position and access information onto combined requirements (step 240), identifying the optimal access points (step 250), evaluating the options and provide recommendations on user actions (step 260). In accordance with yet another embodiment of the present invention, the process can be shared by the user and the network. For example, the network could map the position and access information on the combined requirements and identify various optimal access points for accessing the network services (step 240 and 250), and the user would perform all of the other necessary steps. It will be recognized that the above steps are not limited to strict sharing between the user and the network. The recited steps can also be divided between any number of devices or nodes within the communication network system.

Figure 3A:
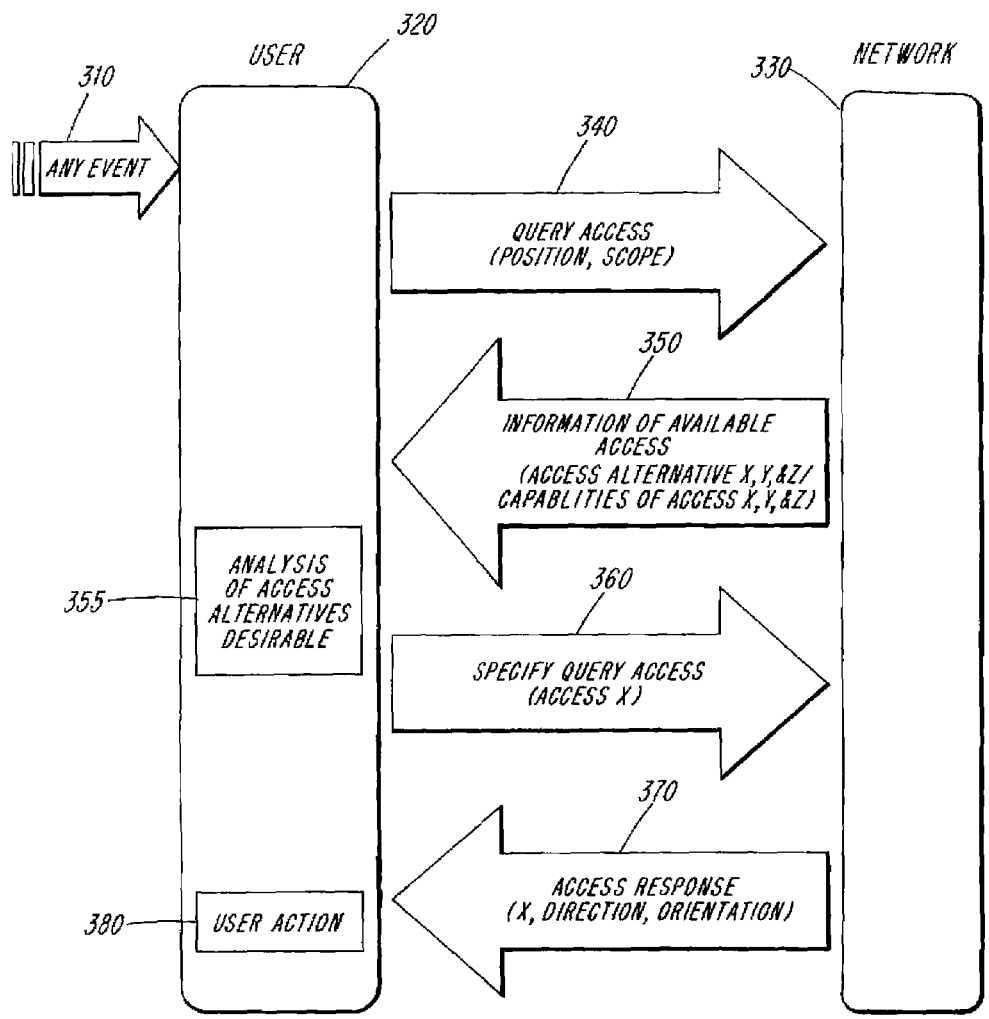
FIG. 3A illustrates signaling between a communication device associated with a user and a network in an IP-based environment, in accordance with exemplary embodiments of the present invention.

FIG. 3A is an illustration of signaling between a communication device, associated with a user 320, and a network 330 in an IP-based environment in accordance with exemplary embodiments of the present invention. Initially, an event 310 causes the communication device to initiate a query 340. to the network 330 abdiifhVailable access alternatives based upon the desired position and scope of the communication device. The triggering event 310 can be initiated by, e.g., periodic updates of the information or an incoming call. The query 340 can, but is not required to, be specified by the user to request information regarding available access points or transport technologies in a certain geographical area, e.g. where the user is located.

The network 330 responds with information 350 about available access and transport technologies or access points in the vicinity of the position requested. The response information 350 indicates the access alternatives or possibilities, and the capabilities of each access, e.g., the network can relay information about the relative position and capabilities of three alternative access points X, Y, and Z. It should be recognized that the discussion of three alternative access points is merely exemplary and that the network can relay information about more or less access points.

The requested position and access information is then mapped against the combined requirements of the communication device. The user 320, or the communication system, can then perform an analysis 355 of the access alternatives which may be desirable, and then send a query 360 to a particular access point, requesting additional information about the specific access point X. The network 330 then provides an access response 370 indicating the geographical location of the access point, and the direction of the user with respect to the access point. In addition, as discussed below, if the user is attempting to access multiple access points for sending split communications via different transport technologies, the access response 370 can be an "optimal" location which provides a access point corresponding to overlapping access coverage areas. The above process can further include the steps of (a) evaluating information related to user preferences which are session specific, e.g. whether the user is in a car or in a meeting, (b) making a suggestion to the user, and (c) responding to the user's choice/actions 380. It should further be noted that the signaling illustrated in FIG. 3A is merely exemplary and the particular signaling will depend upon where the processing is located.

The following example further illustrates the aforementioned process. Consider a situation where a short range wireless access (coverage<10 meters) is available some 50 meters away, while a HiperLan access is available 2 km away from the user. The user may be prompted by the user's communication device, the network, the central point, or a central node within the network (e.g., a centralized common connection between the access networks), about whether the user wishes more information about the access alternatives within walking range. If desired, more detailed information about a certain access can be retrieved from the network to provide detailed recommendations to the user about how to change position and spatial orientation of the communication device and associated communication equipment, e.g. the spatial relation between an antenna of a communication device and an antenna of an access point or the spatial relation between an infrared transceiver of the communication terminal and an infrared transceiver of an access point. The alignment of the antennas for the communication device and the access point can either be done manually by the user or automatically.

The user is benefitted by being able to personalize and optimize the capabilities of each session. The influence that the user has over each session can be used to get the required bandwidth, lower costs, etc. Further, the user is benefitted from recommendation embodiments of the invention which increase the likelihood of successful communication sessions. The owner of the network profits from an increase in traffic volume due in part to the recommendation of services which the user might not otherwise utilize, and from the user satisfaction for the services provided. For example, FIG. 3B shows that user "A" desires minimal cost and high security (128 bit encryption coding), but is not concerned about the speed or quality of the transport connection. On the other hand, user "B" desires a speed greater than 128 Kbps and a high quality of transport connection, but is not concerned about the cost or security of the connection. The user preferences can be universal, or can be specific to a particular session. Moreover, these user preferences can either be inputted by the user, or stored in the communication device or the network. These individual preferences are considered when evaluating the optimal and alternative transport technologies or access points. Accordingly, users are benefitted through optimized and personalized sessions, and the service providers profit from satisfied customers and ultimately increased service use.

The above list of preferences is not meant to be exhaustive, but rather merely illustrative of possible user preferences. Further, it will be recognized that there are many uses and variations possible using the mechanisms described above. For example, the user may wish to establish a hierarchy or different sets of preferences during different sessions. For example, the user may wish to put cost as a high priority, except during sessions when the application calls for video data. During these video sessions, the user may specify that speed and quality replace cost as the high priority. In addition, the user may wish to specify user preferences for the entire PAN depending upon which devices are used during the session conjunctively or simultaneously in a multimedia environment. For example, the user may specify that when using the phone in conjunction with a multimedia video and sound player, quality and speed are a utmost concern. Alternatively, the user may specify that when the cellular phone is used simultaneously with a paging unit, cost is considered a high priority.

In accordance with another embodiment, it is recognized that the device used to obtain the information about available access areas and points does not have to be used for actually running the application over one of the access points suggested. For example, the user may have several devices within his/her PAN available access different transport technologies both inside and outside the PAN. These devices can then be conjunctively or simultaneously used to obtain and transfer information about position, available access points, mappings, recommendations, etc.

Figure 4:
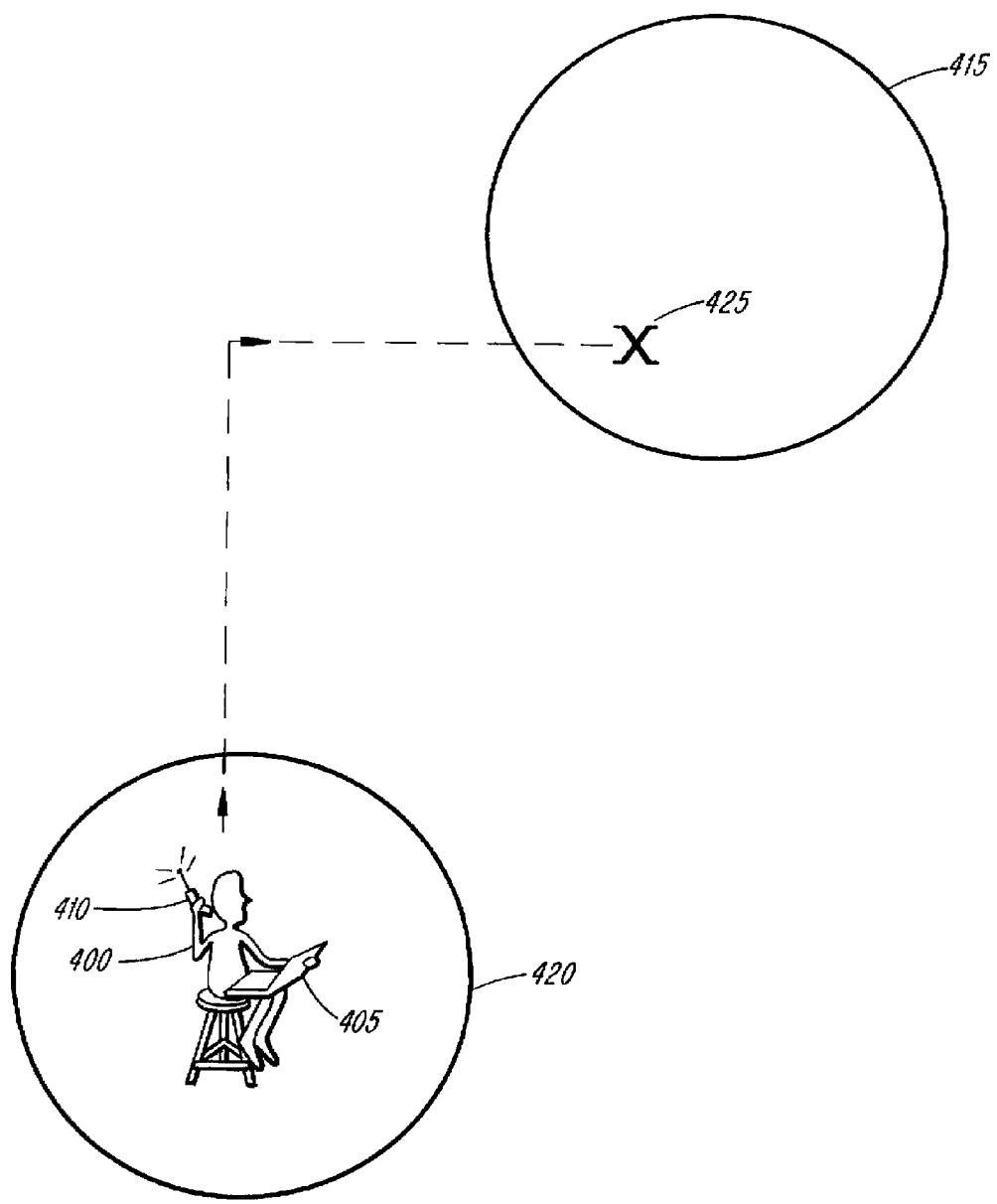
FIG. 4 illustrates an exemplary implementation wherein one communication device forwards to a second communication device access information related to the position and requirements of the second communication device, in accordance with exemplary embodiments of the present invention.

FIG. 4 illustrates an exemplary implementation wherein one communication device forwards to a second communication device access information related to the position and requirements of the second communication device. Accordingly, FIG. 4 illustrates a user 400 with a first and second communication device, a laptop 405 and a mobile radio telephone 410. The user 400 may wish to determine whether a HiperLan access is available for the laptop, in the area 415. The laptop 405 in this example, however, is limited to short range access technologies, such as infrared or Bluetooth. Accordingly, the laptop 405 provides its position in area 420 to the wireless phone 410 using the short range access technology. The wireless phone 410 then uses longer range technology, for example GSM, to communicate with the network and retrieve access information regarding network access connections for the laptop 405, based for example on the laptop's 405 position, capabilities and user preferences. The wireless phone can then provide this access information to the laptop 405 by means of short range communication. The laptop 405 uses the information to select a access point 425. The user 400 can then proceed to the point of access 425 and/or orient the laptop 405 in relation to a point of access, or take any other actions needed to enable the laptop 405 to communicate with the access 425. The laptop 405 and the wireless phone 410, can work together to evaluate the information exchanged between the access network and the mobile radio telephone. For example, the cellular phone 410 can simply act as a relay between the laptop and the access network, thereby allowing the laptop 405 to perform the mapping and evaluation process of the optimal access points.

Moreover, the present invention can be used to provide information regarding points of access which are related to a future position of a communication device. For example, a user of a communication device may decide that in several days the user wishes to access a HiperLan network while waiting in an airport. The user can have the communication device send a request to the network for this information, indicating to the network the position the communication device will have at the airport. The network can then retrieve information regarding access points at the airport and provide this information to the communication device. The communication device, or the network, can optionally store this information for later use.

In addition, an exemplary embodiment of the present invention is used to determine an "optimal" access point or area which supports a heterogenous transport environment. For example, in the case of simultaneous transmission of voice and video data, the voice portions of an application are transmitted over a less expensive, limited bandwidth, access transport while the video portions are sent on a high speed, wide-band connection. According to the present invention, an "optimal" access point or area can be located which allows communication with two or more access points for this heterogenous application.

Figure 5:
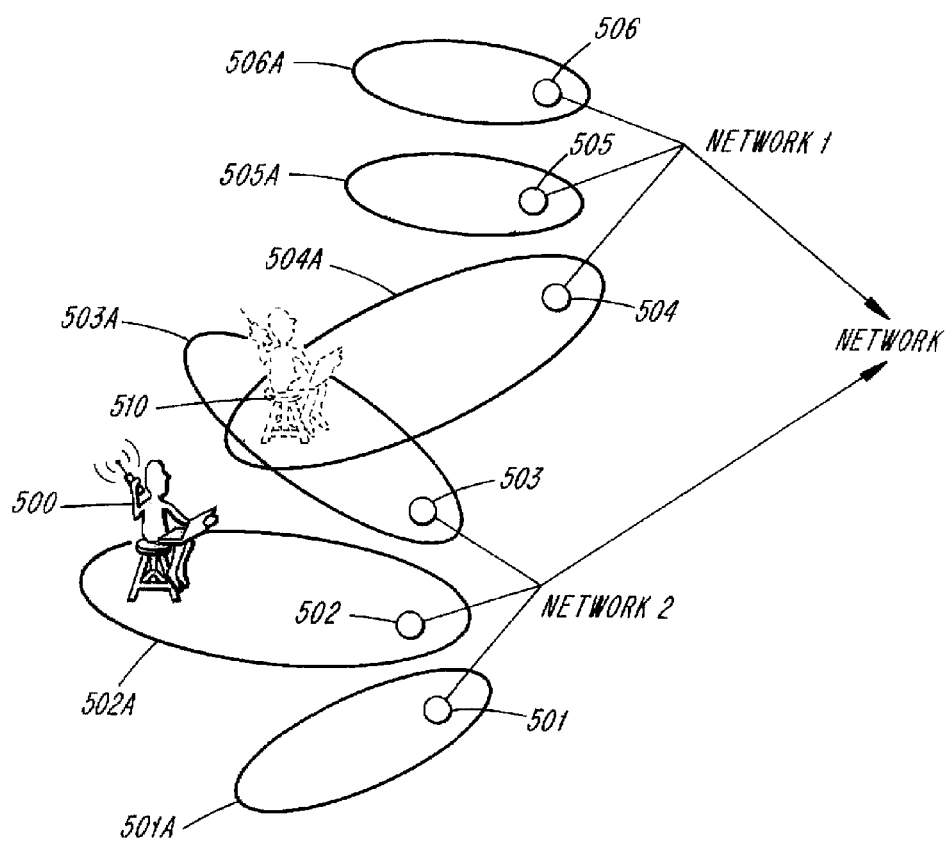
FIG. 5 illustrates an exemplary implementation for determining the optimal access transport area in a heterogeneous environment.

FIG. 5 is illustrative of how the present invention determines the "optimal" access area for a user utilizing multiple access technologies. Access network1 and network2 each have three physical access points 504, 505, 506 and 501, 502, 503, respectively. Each physical access point has a corresponding coverage areas 504A, 505A, 506A, 501A, 502A, and 503A. The user 500, located within coverage area 502A, inquires about available access networks that will support the simultaneous use of a multimedia communication devise(s) requiring the transport connections for both network1 and network2. Using any of the processes describe above, the position and combined requirements of the devices are determined, which are subsequently mapped according to the available access points in each of network. This information is then further analyzed to determine that the overlapping area of coverage areas 502A and 503A would produce the optimal access location 510 to fulfill the user preferences and requirements during this session. Accordingly, a recommendation is provided for optimal access area 510 with directions giving a spatial orientation with respect to the communication device.

Although the present invention has been described in connection with a heterogeneous environment, it will be recognized by those of ordinary skill in the art that the described system and methods are equally applicable in a homogeneous environment.

It will be recognized that the use of the term communication device above is intended to include a broad range of devices and not just devices which are primarily intended for communication. For example, the communication device can be a personal digital assistant (PDA), a laptop computer, a cellular phone, or any device capable of transferring information or communicating with other machines.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for selecting an access point for a communication device, said method comprising:
   determining a position of the communication device;
   determining available access points, each of said access points being associated with an access network, and having a cost associated with use of the access point;
   obtaining capabilities information related to the available access points and their associated access networks;
   determining combined requirements of the communication device, said combined requirements including:
      a profile of operating capabilities of the communication device;
   quality of service requirements of a service requested by the communication device;
   connection transport requirements of an application requested by the communication device; and
   user preferences regarding a desired access point, said user preferences including cost, speed, quality, and security associated with the desired access point;
   mapping the capabilities information related to the available access points and associated access networks with the position and the combined requirements of the communication device to obtain mapped information;
   if an available access point and associated access network meet all of the combined requirements of the communication device according to the obtained mapped information, selecting the available access point; and
   if none of the available access points and associated access networks meet all of the combined requirements of the communication device;
   determininq mismatched requirements between the combined requirements of the communication device and the capabilities of the available access points and associated access networks;
   determininq for the mismatched requirements for each available access point, a compromise between the combined requirements of the communication device and the capabilities of the available access point and associated access network; and
   selecting the available access point that requires the least compromise from the combined requirements of the communication device.

2. The method of claim 1, wherein the mapping step comprises the steps of:

determining a geographical position of the available access points relative to the position of the communication device; and determining a spatial relation between an antenna of the communication device and the available access points, wherein the information related to avairable access points includes information related to the position and the spatial relation between the available access points and the antenna of the communication device.

3. The method of claim 2, wherein the determined spatial relation between an antenna of the communication device and the access points is an intermediate position within communication range of at least two of the access points.

4. The method of claim 3, wherein the intermediate position within communication range of the at least two access points is an optimal position based on the combined requirements.

5. The method of claim 2, wherein the mapping is performed in the communication device.

6. The method of claim 5, wherein a node in an access system provides the information related to the position and the spatial relation between the access points and the communication device.

7. The method of claim 6, wherein the node is common to at least two access networks within a network system.

8. The method of claim 2, wherein the communication device is located within a personal area network, and wherein the mapping is performed by a second device within the personal area network.

9. The method of claim 8, wherein a node in an access system provides the information related to the position and the spatial relation between the access points and the communication device.

10. The method of claim 9, wherein the node is common to at least two access networks within a network system.

11. The method of claim 2, wherein the mapping is performed by a node in an access network.

12. The method of claim 1, wherein the selecting step is performed with user interaction.

13. The method of cliam 1, wherein the combined requirements for the communication device are further based upon user preferences associated with a second communication device within a personal area network.

14. The method of claim 1, wherein the user preferences are selected from the group consisting of:
security services provided by an access point and trust between the communication device and the access point.

15. The method of claim 1, wherein the user preferences are stored in the communication device.

16. The method of claim 1, wherein the user preferences are stored in a second device within a personal area network.

17. The method of claim 1, wherein the user preferences are stored in a communication system and the system selectively provides the communication device with information related to access points.

18. The method of claim 1, wherein the selecting step is performed without user interaction.

19. The method of claim 1, further comprising the steps of:
receiving, by a second communication device within a personal area network, the position and combined requirements of the communication device;
providing, by the second communication device, the position and combined requirements to a network; and
receiving, by the second communication device from the network, capabilities and cost information related to access points and associated access networks, wherein the second communication device provides the communication device with the capabilities and cost information related to access points and associated access networks.

20. The method of claim 1, wherein the determined position is not the current geographical position of the communication device.

21. The method of claim 1, wherein the determined position is a predetermined position of the communication device and the determined position is not related to the current position of the communication device.

22. The method of claim 1, wherein the step of determining combined requirements of the communication device includes determining an environment of the communication device, wherein the mapping step includes considering the environment of the communication device to obtain the mapped information.

23. The method of claim 22, wherein the mapping step includes recommending an access point.

24. The method of claim 23, wherein the recommendation is presented to a user.

25. The method of claim 23, wherein the recommendation is presented to a central intelligence.

26. The method of claim 1, wherein the information related to access points includes recommendations related to the access points.

27. The method of claim 26, wherein the recommendations include directions for locating at least one access point.

28. The method of claim 27, wherein the directions include information related to distance or spatial position between the communication device and at least one access point.

29. The method of claim 1, wherein the mapped information is a subset of the determined available access points, and wherein the selection of at least one access point is not a point in the subset.

30. A system for selecting an access point for a communication device, comprising:
a communication device adapted to selectively communicate using a first or second access technology and to select an access point based on information provided by a network node; and
a network including a node, wherein the node receives a position and combined requirements of the communication device, said combined requirements including:
a profile of operating capabilities of the communication device;
quality of service requirements of a service requested by the communication device; connection transport requirements of an application requested by the communication device; and
user preferences regarding a desired access point, said user preferences including cost, speed, quality, and security associated with the desired access point;
wherein the node includes:
means for determining the capabilities of access points available to serve the position of the communication device:
means for comparing the combined requirements of the communication device with the capabilities of the available access points;
means for determining which available access points satisfy all of the combined requirements of the communication device, wherein the node provides the communication device with capabilities and cost information related to the available access points for networks which use the first or second access technology;

means for determining mismatched requirements between the combined requirements of the communication device and the capabilities of the available access points if there are no available access points that satisfy all of the combined requirements of the communication device; and means for determining for the mismatched requirements for each available access point, a compromise between the combined requirements of the communication device and the capabilities of the available access point;

wherein, if more that one available access point satisfies all of the combined requirements of the communication device, the communication device selects an access point based on the cost information received from the network node; and wherein if none of the access points satisfy all of the combined requirements of the communication device, the communication device selects an access point that requires the least compromise from the combined requirements of the communication device.

31. The system of claim 30, wherein the node is a second communication device and the network is a personal area network including the communication device.

32. The system of claim 30, wherein the first and the second access technologies are the same technologies.

33. The system of claim 30, wherein the node comprises:
means for determining a position of available access points relative to the position of the communication device; and
means for determining a spatial relation between an antenna of the communication device and an antenna of the access points, wherein the information related to access points includes information related to the position and the spatial relation between the antenna of the access points and the antenna of the communication device.

34. The system of claim 33, wherein the alignment of the antennas is made automatically without user interaction.

35. The system of claim 33, wherein the determined position is not the current geographical position of the communication device.

36. The system of claim 33, wherein the determined position is a predetermined position of the communication device and the determined position is not related to the current position of the communication device.

37. The system of claim 33, wherein the determined position is a generalized geographical area.

38. The system of claim 30, wherein the user preferences are selected from the group consisting of: security services provided by an access point and trust between the communication device and the access point.

39. The system of claim 30, wherein the user preferences are stored in the communication device.

40. The system of claim 30, wherein the user preferences are stored in a network system.

41. The system of claim 30, wherein the user preferences are stored in the node and the node selectively provides the communication device with information related to access points.

42. The system of claim 30, wherein the node is a second communication device and the preferences are stored in the second communication device which selectively provides the first communication device with information related to access points.

43. The system of claim 30, further comprising:
a second communication device which receives the position information and combined requirements of the communication device, provides the position information and requirements to the node, receives from the node information related to access points, and provides the communication device with the information related to access points.

44. The system of claim 30, wherein the information related to access points includes recommendations related to the access points.

45. The system of claim 44, wherein the recommendations include directions for locating at least one access point.

46. The system of claim 44, wherein the recommendations include directions to a geographical area which is an intermediate position within communication range of at least two access points, which are to be used simultaneously.

47. The system of claim 44, wherein the directions include information related to distance or spatial orientation between the communication device and at least one access point.

48. The system of claim 30, wherein the node also includes means for determining an environment of the communication device, wherein the node considers the determined environment of the communication device when determining available access points.

49. The system of claim 48, wherein the environment is a homogeneous transport environment.

50. The system of claim 48, wherein the environment is a heterogeneous transport environment.

51. The system of claim 30, wherein application data related to access technologies is split into separate pads, wherein each part is mapped onto different access techniques according to the combined requirements.

* * * * *

UNITED STATES PATENT AND TRADEMARK OFFICE
CERTIFICATE OF CORRECTION

| | | |
|---|---|---|
| PATENT NO. | : 7,143,171 B2 | |
| APPLICATION NO. | : 09/986417 | |
| DATED | : November 28, 2006 | |
| INVENTOR(S) | : Eriksson et al. | |

It is certified that error appears in the above-identified patent and that said Letters Patent is hereby corrected as shown below:

In the Drawings, Sheet 4 of 7, in Figure 3A, under Tag 350, delete "CAPABLITIES" and insert -- CAPABILITIES --, therefor.

In Column 7, Line 6, after "340" delete ".".

In Column 7, Line 6, delete "abdiifh Vailable" and insert -- about available --, therefor.

In Column 10, Line 53, in Claim 1, after "device" delete ";" and insert -- : --, therefor.

In Column 10, Line 54, in Claim 1, delete "determininq" and insert -- determining --, therefor.

In Column 10, Line 58, in Claim 1, delete "determininq" and insert -- determining --, therefor.

In Column 11, Line 6, in Claim 2, delete " avairable" and insert -- available --, therefor.

In Column 11, Line 40, in Claim 13, delete "cliam" and insert -- claim --, therefor.

In Column 12, Line 60, in Claim 30, after "device" delete if and insert -- ; --, therefor.

In Column 13, Line 13, in Claim 30, delete "that" and insert -- than --, therefor.

In Column 14, Line 47, in Claim 51, after "separate" delete "pads" and insert -- parts --, therefor.

Signed and Sealed this

Eighteenth Day of December, 2007

JON W. DUDAS
*Director of the United States Patent and Trademark Office*